United States Patent [19]

Akasaka et al.

[11] Patent Number: 4,788,902

[45] Date of Patent: Dec. 6, 1988

[54] THRUST HYDROSTATIC BEARING DEVICE FOR USE IN AXIAL PISTON MACHINE

[75] Inventors: Yoshimichi Akasaka, Tsuchiura; Ichiro Nakamura, Katsuta; Ken Ichiryu, Ibaraki; Eiji Kometani, Abiko; Yasuharu Gotoh, Tsuchiura, all of Japan

[73] Assignees: Hitachi Ltd.; Hitachi Construction Machinery, both of Tokyo, Japan

[21] Appl. No.: 88,415

[22] Filed: Aug. 24, 1987

[30] Foreign Application Priority Data

Aug. 25, 1986 [JP] Japan ................................ 61-197157
Jan. 16, 1987 [JP] Japan ................................ 62-6016

[51] Int. Cl.⁴ ........................ F01B 13/04; F16C 32/06
[52] U.S. Cl. ........................................ 91/486; 91/499; 91/504; 92/12.2; 92/57; 384/121
[58] Field of Search ................................ 91/484–489, 91/499, 504; 92/12.2, 57; 384/121

[56] References Cited

U.S. PATENT DOCUMENTS

| | | | |
|---|---|---|---|
| 3,119,639 | 1/1964 | Adams | 384/121 |
| 3,257,960 | 6/1966 | Keel | 91/486 X |
| 3,635,126 | 1/1972 | Engel et al. | 91/486 X |
| 3,768,377 | 10/1973 | Engel et al. | 91/486 |
| 3,862,588 | 1/1975 | Bahrle et al. | 91/486 |
| 3,943,828 | 3/1976 | Wagenseil | 91/499 |
| 4,546,692 | 10/1985 | Lotter et al. | 91/488 X |

FOREIGN PATENT DOCUMENTS

2220847 11/1972 Fed. Rep. of Germany ...... 384/121
213953 12/1984 Japan ................................ 91/499

Primary Examiner—Paul F. Neils
Attorney, Agent, or Firm—Antonelli, Terry & Wands

[57] ABSTRACT

A thrust hydrostatic bearing device for use in an axial piston machine includes a bearing sleeve fitted into a housing cover for rotatably supporting a drive shaft through a bearing and having a plurality of hydrostatic pads. The hydrostatic pads are disposed at locations which are symmetrical with respect to an axis lying in a cross-section taken perpendicular to the drive shaft, and these pads increase the performance and durability of the thrust hydrostatic bearing device for use in an axial piston machine.

8 Claims, 7 Drawing Sheets

THRUST HYDROSTATIC BEARING DEVICE FOR USE IN AXIAL PISTON MACHINE

BACKGROUND OF THE INVENTION

The present invention relates to a ben axis type axial piston machine. More particularly, the present invention pertains to a thrust-radial hydrostatic bearing support type, bent axis type axial piston machine which is suitable for use at high pressures. Still more particularly, the present invention is concerned with a thrust hydrostatic bearing device for use in an axial piston machine which is suitable for carrying out a method of supporting the axial components of piston reaction force loads, relative to a driving shaft, as well as moment loads caused by these axial components.

Known devices of the type described above are designed to support thrust loads by the provision of a hydrostatic shoe for each piston. Such a device is disclosed in, for example, the specification of Japanese Patent Laid-Open No. 131776/1984.

In this piston machine, the number of pistons associated with the discharge pressure varies between certain values and is in accordance with the total number of pistons. For example, if a total of nine pistons is provided, the number of pistons associated with the discharge pressure varies between five and four. Therefore, the resultant force of the piston reaction force loads varies with the number of pistons located in the discharge pressure area and in proportion to the rotational speed of a driving shaft, the path of the point of application thereof generally being described as a figure eight. Due to this dynamic behavior of the piston reaction forces, not only thrust loads but also moment loads act on a drive disc of a driving shaft which supports a plurality of piston rods, the moment loads being supported by hydrostatic shoes. In this case, the moment loads also act on the hydrostatic shoes located in the suction pressure area.

When axes perpendicular to each other and to the axis of the driving shaft are called the x-axis and y-axis, moment loads about the x- and y-axes are exerted alternately on the drive disc in correspondence with the discharge pressure. In the prior art, however, it has not been considered necessary to support such moment loads uniformly by hydrostatic bearings whose pocket pressures are maintained constant. Therefore, the moment loads have been supported by the hydrostatic shoes which are located in the suction area and are incapable of loading static pressures and the hydrostatic shoes which are located in the discharge pressure area and are capable of loading static pressures, resulting in the hydrostatic shoes located on the suction side coming into contact with the body (or a pressure plate mounted on the operation shaft). This makes part of the plurality of hydrostatic shoes contacted with the body while they are rotated, causing unbalanced wear or seizure thereof. Further, since the sliding surface of the drive disk of the operation shaft is tilted with respect to the sliding surfaces of the plurality of hydrostatic shoes at a fixed angle, leakage will increase from these sliding surfaces, increasing the power loss.

SUMMARY OF THE INVENTION

Accordingly, an object of this invention is to provide a thrust hydrostatic bearing device for use in an axial piston machine which has an improved performance and is durable, by the provision of hydrostatic pads which support axial components of the piston reaction force loads caused by the pistons located in the discharge pressure area.

The above-described object is achieved by the provision of hydrostatic pads which are capable of loading static pressures to bear the axial components of piston reaction force loads caused by the pistons located in the discharge pressure area and which acts on the drive disc. More specifically, in a bearing sleeve provided in a case so as to rotatably support the operation shaft, if the axes perpendicular to each other and to the axis of the bearing sleeve are called the x-axis and y-axis, the bearing sleeve is divided by these axes into four quadrants whose central angles are each 90°. A total of four hydrostatic pads are arranged with a pad in each quadrant and with each pair of pads being symmetrical with respect to the x-axis.

Two of the four hydrostatic pads are disposed on the side of points of application of piston reaction forces in such a manner that the angle $\theta_L$ between each of these two hydrostatic pads and the x-axis is $\theta_L \geq \theta$, where $\theta$ is one-fourth of the angle $\theta_O$ formed by the center of adjacent kidney ports in the cylinder block of the axial piston machine.

In addition, these two hydrostatic pads are disposed on the side of points of application of piston reaction forces in such a manner that the relationship expressed by $e_O + e_L \geq e_{(z-1)/2}$ holds, where $(e_O + e_L)$ is the x-coordinate of the hydrostatic pads disposed on the side at which reaction forces apply and $e_{(z-1)/2}$ is the x-coordinate of the points at which the piston reaction forces act when the number of pistons is $(z-1)/2$.

With respect to the mean point of application of the piston reaction forces (which is the point of application of the piston reaction forces when the total number of pistons of the axial piston machine is Z and the number of pistons associated with the discharge pressure is z/2), the four hydrostatic pads are disposed on the side of point of application of the piston reaction forces and the side of non-application of the piston reaction forces in such a manner that the relationship expressed by the equation $e_L \cdot \theta_L = e_R \cdot \theta_R$ is satisfied (assuming that the hydrostatic pads all have the same pocket pressure and effective pressure receiving area), where $e_L$: the difference between the x-coordinate $e_O$ of the mean point of application of the piston reaction forces and the x-coordinate $E_L$ of the center of each of the hydrostatic pads disposed on the side of points of application of the reaction forces, $e_R$: the sum of the x-coordinate $e_O$ of the mean point of application of the piston reaction forces and the x-coordinate $E_R$ of the center of each of the hydrostatic pads disposed on the side at which the reaction forces are not applied, $\theta_L$: the angle between the center of each of the hydrostatic pads disposed on the side of points of application of the reaction forces and the x-axis, and $\theta_R$: the angle between the center of each of the hydrostatic pads disposed on the side at which the reaction forces are not applied and the y-axis.

With the hydrostatic pads disposed in the above-described manner, it is possible to completely cover the area in which the piston reaction force loads generated by variations in the number of pistons located in the discharge area and the moment loads vary.

DETAILED DESCRIPTION OF THE PREFERRED EMBODIMENTS

A first embodiment of the present invention will hereinunder be described in detail with reference to FIGS. 1 and 2.

An axial piston machine includes a housing cover 1, a cylinder block 3 having a plurality of cylinder holes 2, and pistons 5 movable back and forth within a corresponding cylinder holes 2 and fixed to piston rods 4. The piston rods 4 are pivotally supported within a drive disc 6B which, together with a shaft 6A connected to an operation input shaft (not shown) of the axial piston machine, forms a drive shaft body 6. While no input is being applied to the shaft 6A of the axial piston machine, the shaft 6A and the drive disc 6B are in engagement with each other at a spline shaft connecting section 7, with a certain gap maintained therebetween in the radial direction. Bearings 9 are disposed between the outer periphery of the shaft 6A and a bearing sleeve 8 to rotatably support the shaft 6A. The cylinder block 3 is rotatably mounted through a spherical universal joint or a center rod (both not shown), and is supported on a head cover 12 by a center shaft 10 through a port plate 11 having working medium suction ports 11A and discharge ports 11B. The head cover 12 has suction ports 12A and discharge ports 12B which are made to communicate with the suction ports 11A and the discharge ports 11B on the port plate 11. The spherical universal point is provided with a spherical bearing (neither of which is shown), and is pivotally supported within the drive disc 6B.

A device (not shown) for adjusting and changing the angle of inclination of the cylinder block 3 acts on a yoke (not shown). The stroke of the pistons 5 disposed in the cylinder holes 2 is changed by changing the inclination angle of the cylinder block 3. The drive disc 6B and the shaft 6A are connected by the spline shaft portion 7, and the shaft 6A acts as an input shaft in conformity with the method of operation of the axial piston machine.

The bearing sleeve 8 includes chambers 13, into which rods 1 of hydrostatic bearing pads 16 are inserted, each of which including a restricting portion 14 and a pressure chamber 15. Flanges 18 of the hydrostatic bearing pads 16 are disposed between an end surface 20 of the bearing sleeve 8 which lies perpendicular to the axis thereof and an end surface 21 of the drive disc 6B in such a manner that it is in contact with both end surfaces 20 and 21.

Figure 2:
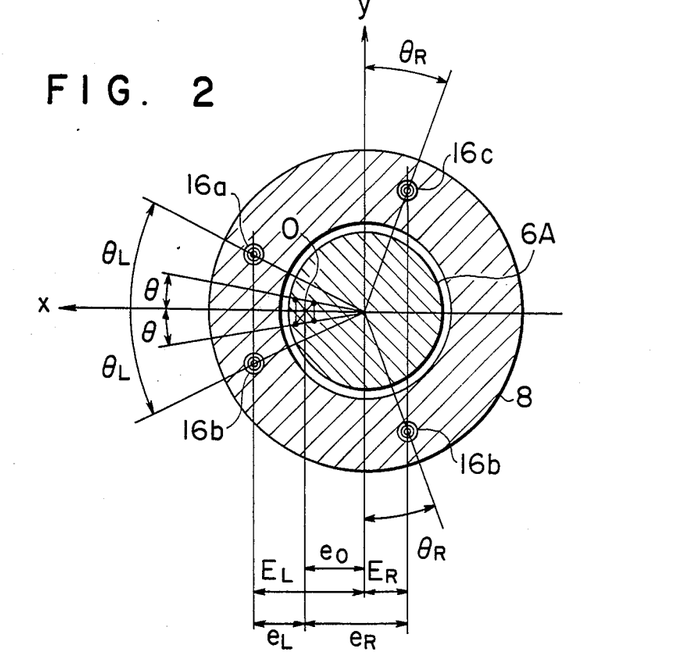
FIG. 2 is a cross-section taken along the line II—II of FIG. 1.

The hydrostatic bearing pads 16, each of which includes the restricting portion 14 and the pressure chamber 15, are disposed at particular positions with respect to the bearing sleeve 8, as shown in FIG. 2. A working medium under a direct discharge pressure Pd is introduced to an end surface 19 of the rod 17 of each hydrostatic bearing pad 16, then into the pressure chamber 15 through the restricting portion 14.

On the other hand, the outer periphery of the drive disc 6B is supported as a radial sliding bearing on a bearing sleeve 22 disposed within the housing 1.

At least four pressure chambers 23, or up to a number thereof which corresponds to the number of pistons 5, are provided on the inner periphery of the bearing sleeve 22 and around the drive shaft 6B at a pitch of at least 90 degrees. The outer periphery of the bearing sleeve 22 is provided with supply ports 24 of the discharge pressure Pd which respectively face the pressure chambers 23 and which respectively communicate with the pressure chambers 23 through restricting portions 25 which control the static pressures in the pressure chambers 23 in correspondence with the loads applied.

An operation of the thus-arranged axial piston machine of the thrust-radial static pressure bearing support and bent axis type will be described below.

In this axial piston machine, the piston reaction force loads and the moment loads act on the drive disc 6B while varying in proportion to the discharge pressure Pd and the number of pressurizing pistons which generate the discharge pressure (if the total piston number is 7, for example, the maximum pressurizing piston number is 4, the minimum pressurizing piston number is 3, and the average pressurizing piston number is 3.5) and in synchronism with the rotational speed of the drive shaft 6. These loads applied to the drive disc 6B can be divided into components acting in the axial direction of the drive disc 6B and those acting in the radial direction thereof on the piston rod supporting surface of the drive disc 6B. If the axes perpendicular to each other and to the axis of the drive shaft are called the x-axis and y-axis, the piston reaction forces generate moment loads about the x- and y-axes, respectively. The loads applied to the drive disc and comprising the moments and the piston reaction force loads divided into two components are supported by a sliding bearing in which the static pressures in the pressure chambers 15 of the hydrostatic bearing pads 16 and the pressure chambers 23 provided on the inner periphery of the bearing sleeve 22 act hydrostatically and hydrodynamically. In particular, the axial components and the moment components are supported by four hydrostatic oil pads disposed independently, as shown in FIG. 2. This means that the drive disc 6B to which the loads are applied are supported in the axial and radial directions of and within the machine housing 1 by the hydrostatic and hydrodynamic sliding bearing which comprises the hydrostatic bearing pads 16 and the bearing sleeve 22.

The form of support of the loads exerted in the axial direction of the drive disc 6B will be described below.

Figure 4:
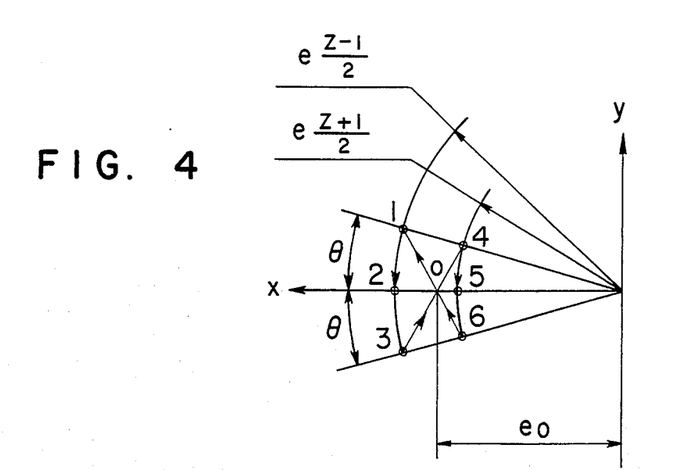
FIG. 4 shows the locus of the points of application of the resultant force of the piston reaction forces in the axial piston machine.

If the total number of pistons is Z, the number of pistons which are located on the discharge pressure side varies between $$\left(\frac{z+1}{2}\right) \text{ and } \left(\frac{z-1}{2}\right),$$

as shown in FIG. 4, and the point of application of the resultant force of the piston reaction force loads therefore shifts, as shown in FIG. 4.

As a result, not only the thrust loads comprising the axial components of the loads but also the moment loads about the x- and y-axes act on the drive disc 6B. In the present embodiment, however, four hydrostatic pads 16a to 16d are disposed at the locations shown in FIG. 2 with the balance of the axial component forces and the balance of the moments with respect to the average point of application of the resultant force of the piston reaction forces taken into consideration. In consequence, the thrust loads and the moment loads can be hydrostatically and hydrodynamically supported by the static and dynamic pressures generated by the hydrostatic pads 16a to 16d in correspondence with the loads applied to the drive disc.

In this embodiment, since the contact surfaces between the drive disc and the hydrostatic pads are maintained such that they form parallel planes without forming excessively inclined planes, contact of the drive disc with the four hydrostatic pads 16a to 16b can be eliminated, preventing unbalanced wear or seizure of the sliding surfaces therebetween. Further, the sliding surface of the drive disc acts in such a manner that it is perpendicular to the axis thereof. This enables the oil film formed between the sliding surfaces of the four hydrostatic pads and that of the drive disc to be substantially uniform and to be in correspondence with the loads applied, minimizing oil leakage from the sliding surfaces.

Figure 3:
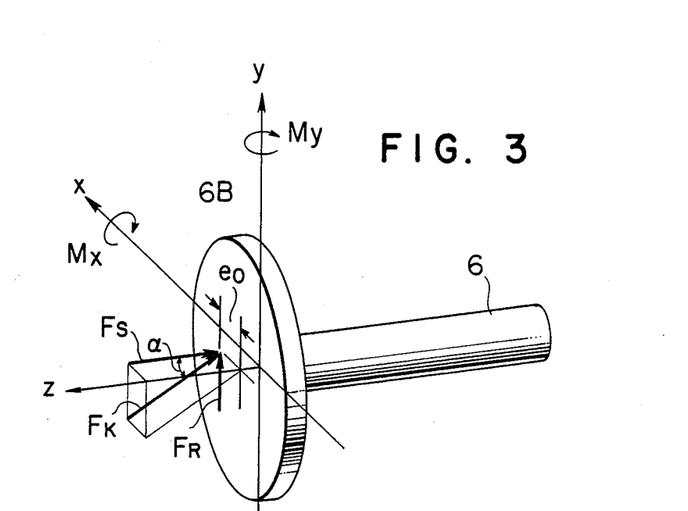
FIG. 3 illustrates the action of piston reaction forces on a drive disc in the axial piston machine of FIG. 2.

As shown in FIG. 3, the piston reaction forces $F_K$ acting on the drive disc of the axial piston machine varies on the basis of variation in the number of pistons associated with the discharge pressure. When the rotary shaft of the cylinder block (not shown) is inclined with respect to the drive shaft 6 by an angle of $\alpha°$, the piston reaction force loads and the moment loads which act on the drive disc 6B are given by the following equations:

$$F_s = F_k \cos \alpha \quad (1)$$

$$F_r = F_k \sin \alpha \quad (2)$$

where $F_s$ is the axial components of the piston reaction force loads and $F_r$ is the radial components of the piston reaction force loads.

$F_k$ is given by the following equation:

$$F_k = Z_k \cdot P_d \cdot A_k \quad (3)$$

where $Z_k$ is the number of pistons associated with the discharge pressure, $P_d$, the discharge pressure, $A_k$, the cross section of the piston $$\left( = \frac{\pi}{4} d k^2 \right),$$

and dk, the diameter of the piston.

The moment components about the x- and y-axes which are generated by the axial components $F_s$ of the piston reaction force loads are given by the following equations:

$$Mx = F_s \left(\frac{z \mp 1}{2}\right) \cdot \sin\alpha \cdot e\left(\frac{z \mp 1}{2}\right) \cdot \sin\theta \quad (4)$$

$$My = F_s \left(\frac{z \mp 1}{2}\right) \cdot \cos\alpha \cdot e\left(\frac{z \mp 1}{2}\right) \cdot \cos\theta \quad (5)$$

Both of these piston reaction force loads and the moment loads simultaneously act on the drive disc.

To cope with this, in the present embodiment, four hydrostatic pads are disposed separately at locations which completely cover the piston reaction force loads shifting area and at which the bending moments about the average point of application of the piston reaction forces (point O in FIG. 4) are maintained in a balanced state. Two hydrostatic pads which are capable of loading static pressures are disposed on the side where no piston reaction forces are applied, and the other two are provided on the side where the piston reaction forces are applied. These four hydrostatic pads serve with respect to the moment loads Mx and My caused by the piston reaction forces to maintain the sliding surface of the drive disc parallel to the sliding surfaces of the hydrostatic pads. In consequence, even if the moment loads comprising Mx and My act on the drive disc as well as the axial components of the piston reaction force loads, the sliding surface of the drive disc does not make contact with the sliding surfaces of the hydrostatic pads. Further, the sliding surface of the drive disc and the sliding surfaces of the hydrostatic pads form parallel planes, the thickness of the oil film formed therebetween being determined by the balance of the thrust. In consequence, leakage from between the sliding surfaces can be minimized, minimizing the power loss caused by the leakage and ensuring the smooth operation of the machine.

Figure 1:
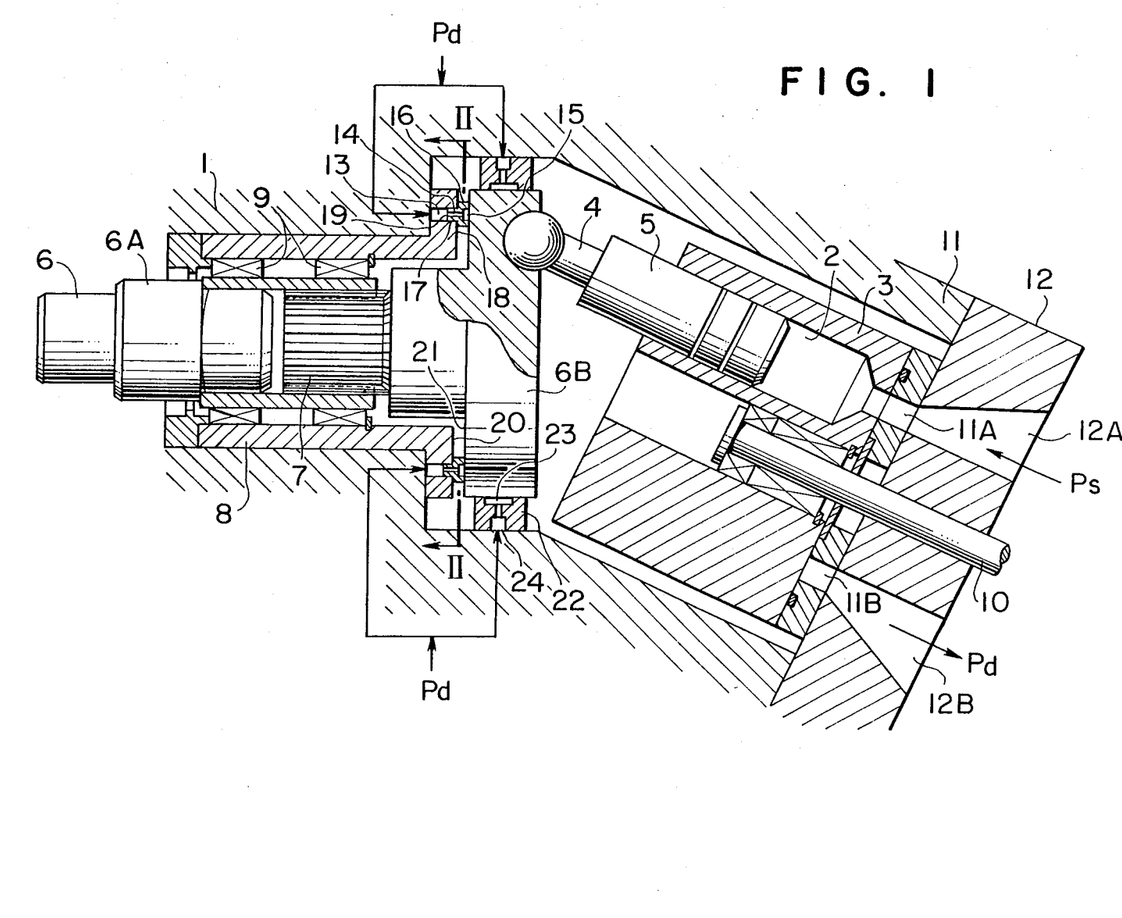
FIG. 1 is a cross-sectional view of a thrust hydrostatic bearing device for use in a thrust-radial hydrostatic bearing support type and bent axis type axial piston machine, illustrating an embodiment of the present invention.

In his embodiment, four hydrostatic pads 16a to 16d are provided, as shown in FIGS. 1 and 2. However, the drive disc may be provided with three hydrostatic pads, and this case will be described below as a second embodiment.

Figure 5:
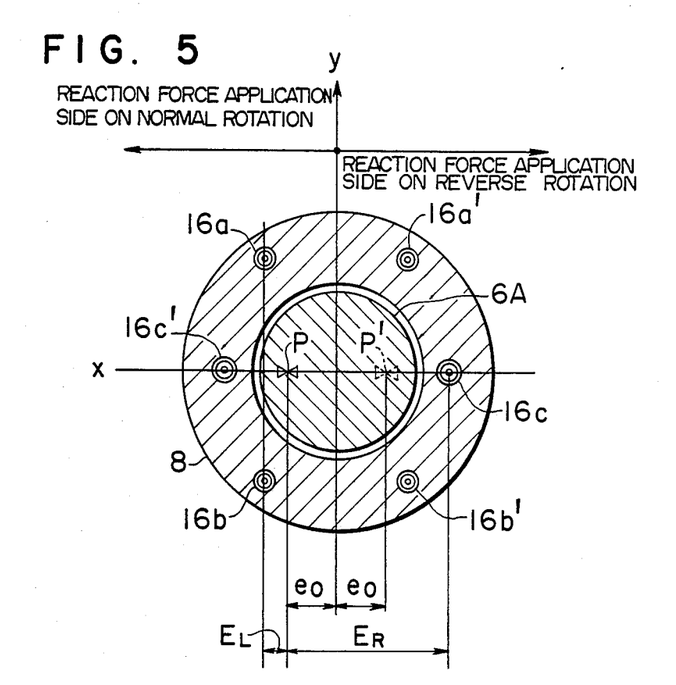
FIG. 5 is a cross-section taken along the line II—II of FIG. 1, showing a second embodiment of the present invention.

The axial components and the moment components of the loads applied to the drive disc are supported by three hydrostatic pads disposed separately, as shown in FIG. 5. Consequently, the drive disc 6B to which the loads are applied are supported in the axial and radial directions of and within the machine housing 1 by the hydrostatic and hydrodynamic sliding bearing which comprises the hydrostatic bearing pads 16 and the bearing sleeve 22.

The form of support of the loads exerted on the drive disc 6B in the axial direction thereof will be described below.

If the total number of pistons is Za, the number of pistons which are located on the discharge pressure side varies between $$\left(\frac{Za+1}{2}\right) \text{ and } \left(\frac{Za-1}{2}\right),$$

as shown in FIG. 4, and the point of application of the resultant force of the piston reaction force loads therefore shifts, as shown in FIG. 4. As a result, not only the thrust loads but also the moment loads about the x- and y-axes act on the drive disc 6B. In the present embodiment, however, three hydrostatic pads 16a to 16c are disposed at the suitable locations shown in FIG. 5 with the balance of the axial component forces and that of the moments with respect to the average point P of application of the resultant force of the piston reaction forces taken into consideration. Consequently, the thrust loads and the moment loads can be hydrostatically and hydrodynamically supported by the static and dynamic pressures generated by the hydrostatic pads 16a to 16c in correspondence with the loads applied.

In this embodiment, since the contact surfaces between the drive disc and the hydrostatic pads are maintained such that they form parallel planes without forming exccessively inclined planes, contact of the drive disc with the three hydrostatic pads 16a to 16c can be eliminated, preventing unbalanced wear or seizure of the sliding surfaces thereof. Further, the sliding surfaces of the drive disc and the hydrostatic pads are kept perpendicular to the axis of the drive disc. This enables the oil film formed between the sliding surfaces of the three hydrostatic pads and that of the drive disc to be substantially uniform, the thickness thereof being in correspondence with the loads applied, minimizing the oil leakage from between the sliding surfaces.

In this embodiment shown in FIG. 5, if the hydrostatic pads 16a to 16c are disposed in such a manner that $$F_p > \sum_{i=1}^{3} W_i > \sum_{i=1}^{3} F_{si} \text{ or } F_{pi} > \sum_{i=1}^{3} W_i > \sum_{i=1}^{3} F_{si}$$

$$\text{and } \sum_{i=1}^{3} W_i \leq \sum_{i=1}^{3} F_{si}$$

holds, where $F_p$ is the resultant force of the piston reaction forces, $W_i$ to $W_3$, the load capacities of the pads' static pressure guide surfaces which face the hydrostatic pads 16a to 16c, respectively, and $F_{s1}$ to $F_{s3}$, the rod thrusts corresponding to the hydrostatic pads, the hydrostatic pads can support the drive shaft hydrostatically and hydrodynamically in the state wherein the hydrostatic pads are pressed against the fixed portions when the piston reaction forces act on the drive disc. Accordingly, the positioning in the thrust direction of the drive shaft can be ensured by disposing, at the bearing sleeve 22 the hydrostatic pad having a property meeting the relation $F_p \geq W \geq F_s$, where $F_p$ represents the resultant force of the piston reaction forces, W represents the load capacity in the hydrostatic pressure guide face of the pad. This also enables the drive shaft of the axial piston machine to be accurately positioned in the thrust direction irrespective of the magnitude of the resultant force of the piston reaction forces. Therefore, leakage of the oil from between the sliding surfaces of the drive disc and the hydrostatic pads can be minimized, minimizing the power loss caused by the leakage and ensuring smooth operation of the machine.

In this embodiment, the piston pump has been supported by three hydrostatic pads. However, the present invention can be applied with the same effect to a piston motor which employs four hydrostatic pads or any other number thereof which corresponds to the number of pistons.

A third embodiment of the thrust hydrostatic bearing device for the axial piston machine will now be described with reference to FIGS. 6 to 9.

Figure 6:
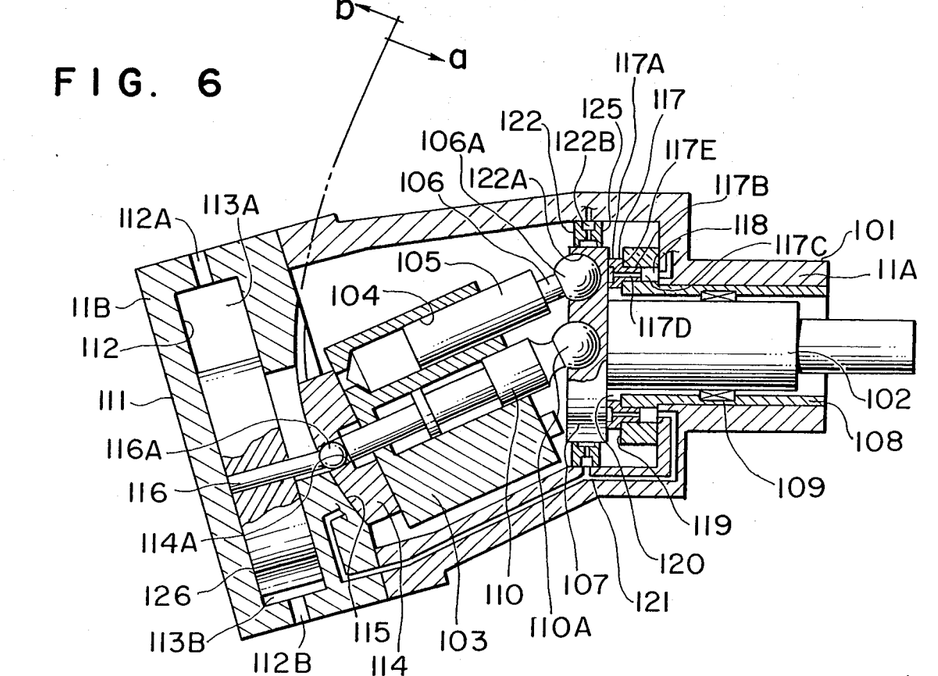
FIG. 6 is a cross-sectional view of a thrust hydrostatic bearing device for use in an axial piston machine, showing a third embodiment of the present invention.

Referring first to FIG. 6, a casing 101 includes a cylindrical casing body 101A, and a head casing 101B which closes one end of the casing body 101A. The casing body 101A houses a bearing sleeve 108, a bearing 109 disposed within the bearing sleeve 108, a rotary shaft 102 rotatably supported by the bearing 109, and a cylinder block 103 rotatable together with the rotary shaft 102. The cylinder block 103 is provided with a plurality of cylinder holes 104 which extend in the axial direction thereof, into which pistons 105 are slidably inserted. Each piston 105 mounts a connecting rod 106, and the distal end of the connecting rod is provided with a spherical portion 106a. The spherical portion 106A of each connecting rod 106 is pivotally supported by a drive disc 107 formed at the distal end of the rotary shaft 102.

The casing body 101A also houses ports plate 114. One end surface of the plate 114 contacts the cylinder block 103, while the other end surface thereof slidably contacts arcurate inclined sliding portion 115 which is formed in the head casing 101B. The center of the ports plate 114 is provided with a through-hole 114A into which the leading ends of a center shaft 110 and a pivot pin 116 to be described later are respectively inserted from both sides thereof. The ports plate 114 is also provided with suction and discharge ports (not shown) which intermittently communicate with the cylinder holes 104 while the cylinder block 103 is being rotated and which communicate with the suction and discharge ports (not shown) opening at the arcuate sliding surface 115 of the head casing 101B irrespective of the inclination of the ports plate 114.

The center shaft 110 extends between the drive disc 107 and the ports plate 114 to support the cylinder block 103. One end of the center shaft 110 is provided with a spherical portion 110A which is pivotally supported by the drive disc 107, while the other end thereof is slidably inserted into the throughhole 114A of the ports plate 114, so as to provide centering between the cylinder block 103 and the port plate 114.

An inclining mechanism 111, which inclines the ports plate 114 during rotation along the sliding surface 115, is provided in the head casing 101B. It includes a cylinder chamber 112 having oil passages 112A and 112B at both ends in the axial direction thereof, a servo piston 126 slidably inserted within the cylinder chamber 112 and defining pressure chambers 113A and 113B at both ends in the axial direction thereof, and the pivot pin 116 fitted onto the periphery of the servo piston 126 and having a distal end which is provided with a spherical end portion 116A pivotally inserted into the through-hole 114A of the port plate 114. The inclining mechanism is driven by an auxiliary pump (not shown) which supplies pressurized oil through pipings (not shown) from the oil passages 112A and 112B into the pressure chambers 113A and 113B.

The bearing sleeve 108 includes chambers 118, into which rods 117B of hydrostatic pads 117 are inserted, each of the hydrostatic pads comprising a restricting portion 117D and a pressure chamber 117E. Flange 117A of the hydrostatic pads 117 are disposed between an end surface 119 which is perpendicular to the axis of the bearing sleeve 108 and an end surface 120 of the drive disc 107 in such a manner that it makes contact with both surfaces 119 and 120.

The hydrostatic pads 117 are disposed at specified locations with respect to the bearing sleeve 108. The discharge pressure which is adjusted in synchronism with the inclination angle by a restricting mechanism according to the present invention is introduced to an end surface 119 of the rod 117B of each hydrostatic pad 117 through an oil passage 121, then into the pressure chamber 117E via the restricting portion 117D.

To support the radial components of the piston reaction forces by the fixed hydrostatic pads, the outer periphery of the drive disc 107 is supported as a radial sliding bearing on a bearing sleeve 122 disposed within the housing body 101A. More specifically, at least three pressure chambers 122A or up to a number thereof which corresponds to the number of pistons 105 are provided on the inner peripheral surface of the bearing sleeve 122 and around the drive disc 107. Discharge pressure supplying ports 122B are provided on the outer periphery of the bearing sleeve 122 in such a manner that they face the pressure chambers 122A and that they communicate therewith through restricting portions 125 which control the static pressures of the pressure chambers 122A in correspondence with the loads applied.

An operation of the axial piston machine which is used as a hydraulic pump will be described below.

First, the ports plate 114 is inclined together with the cylinder block 103 to a position shown in FIG. 6 by the inclining mechanism 111. To do so, pressurized oil is supplied by the auxiliary pump (not shown) into the pressure chamber 113A located at one end of the cylinder chamber 112 so as to displace the servo piston 126. The pivot pin 116 is displaced by the displacement of the servo piston 126, sliding the ports plate 114 along the sliding surface 115 and inclining it together with the cylinder block 103 so that the center of rotation of the cylinder block 103 is inclined with respect to the center of rotation of the rotary shaft, as shown in FIG. 6.

Next, the rotary shaft is rotated by rotating the drive source such as an engine or a motor. Since, the drive disc 107 of the rotary shaft 102 and the pistons 105 inserted into the cylinder holes 104 of the cylinder block 103 are connected by the connecting rods 106, the cylinder block 103 is rotated together with the rotary shaft 102, causing the pistons 105 to move back and forth in the corresponding cylinder holes 104. Retracting of each piston 105 from the interior of the corresponding cylinder hole 104 corresponds to a suction stroke thereof in which the working oil is sucked into the cylinder hole 104 through the corresponding suction port from the suction passage, and insertion thereof into the corresponding cylinder hole 104 corresponds to a discharge stroke in which the pressurized working oil in the cylinder hole 104 is discharged from the discharge passage through the discharge port.

In the thus-arranged axial piston machine, the piston reaction force loads and the moment loads act on the drive disc 107 while varying in proportion to the discharge pressure and the number of pressurizing pistons which generate the discharge pressure (if the total piston number is 7, for example, the maximum pressurizing piston number is 4, the minimum pressurizing piston number is 3, and the average pressurizing piston number is 3.5) and in synchronism with the rotational speed of the rotary shaft 102. The loads acting on the drive disc 107 can divided into the components acting in the axial direction of the drive disc 107 and those acting in the radial direction thereof on the piston rods supporting surface of the drive disc 107. If the axes perpendicular to each other and to the axis of the rotary shaft are called the x-axis and y-axis, the piston reaction forces generate moment loads about the x- and y-axes, respectively. The loads applied to the drive disc and comprising the moments and the loads divided into two components are supported by a sliding bearing in which the static pressures in the pressure chambers 117E of the hydrostatic bearing pads 117 and the pressure chambers 122A provided on the inner periphery of the bearing sleeve 122 act hydrostatically and hydrodynamically. In particular, the axial components and the moment components are supported by three or four hydrostatic bearing means. This means that the drive disc 107 to which the loads are applied is supported in the axial and radial directions of and within the machine housing 101 by the hydrostatic and hydrodynamic sliding bearing which comprises the hydrostatic bearing pads 117 and the bearing sleeve 122.

The form of support of the loads exerted in the axial direction of the drive disc 107 will be described below.

Figure 7:
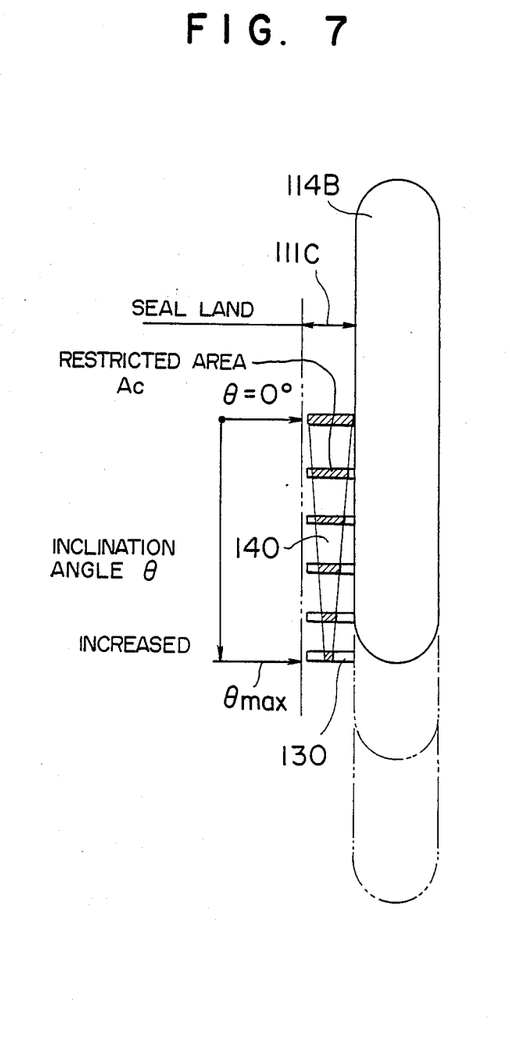
FIG. 7 illustrates the variable operation of the discharge pressure produced by a restricted area varying mechanism of the present invention.
Figure 8:
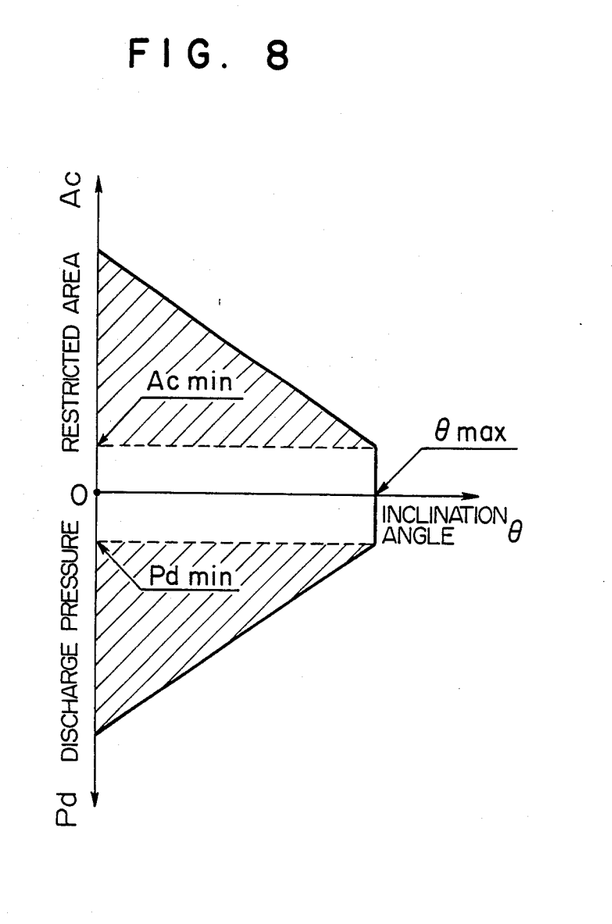
FIG. 8 illustrates the relationship between angle of inclination, a restricted area, and discharge pressure.

The loads comprising the piston reaction forces vary in accordance with the number of pistons. The axial components of the piston reaction forces $F_p$, i.e., the vertical components of the loads acting on the drive disc 107 is given by $F_p \cos \theta$, because the center of rotation of the cylinder block 103 is inclined with respect to the axis of the rotary shaft 102 by an angle $\theta$. The loads to be supported by the hydrostatic pads 117 vary in accordance with the inclination angle $\theta$ with the thrust to be supported by the hydrostatic pads being at the maximum when $\theta = 0°$ and decreasing as the inclination angles increases. In this embodiment, when the thrust which varies as the inclination angle $\theta$ changes is supported by the hydrostatic pads, the pressure supplied to the hydrostatic pads is continuously or intermittently changed, i.e., a restricted area Ac (an area shown by the oblique line in FIG. 7 where reference numeral 114B denotes a discharge port provided in a concave arcuate slide surface 115 formed on the head casing 101B, and numeral 111C denotes a seal land formed at an outside of the discharge port 114B in the head casing) formed by a plane restricting mechanism is controlled in synchronism with the inclination angle, the plane restricting mechanism comprising an oil groove 130 provided on the discharge ports side of the port plate, and a wedge-shaped oil groove 140 provided within inner and outer seal lands of the arcurate sliding surface formed in the head casing 101B (a wedge-shaped oil groove provided within the land width of the outer seal land). More specifically, as shown in FIG. 8, when the inclination angle $\theta$ is 0°, the restricted area Ac is at maximum and the discharge pressure of the pump is introduced to the pressure chambers 117E of the hydrostatic pads 117 without being restricted by the variable plane restricting mechanism. On the other hand, when the inclination angle $\theta$ is $\theta$ max, a suitable restricted area Ac (which is Acmin) is automatically determined to obtain appropriate discharge pressure (which is $P_{dmin}$).

In this embodiment, it is thus possible to intermittently or continuously vary the pressure of the pump, i.e., the pressure to be supplied to the hydrostatic pads 117 in response to the inclination angle.

In consequence, even if the inclination angle of the cylinder block 103 changes between 0° and the maximum value intermittently or continuously, it is possible to adjust the pressure supplied to the hydrostatic pads to a suitable value in synchronism with the inclination angle.

Figure 9:
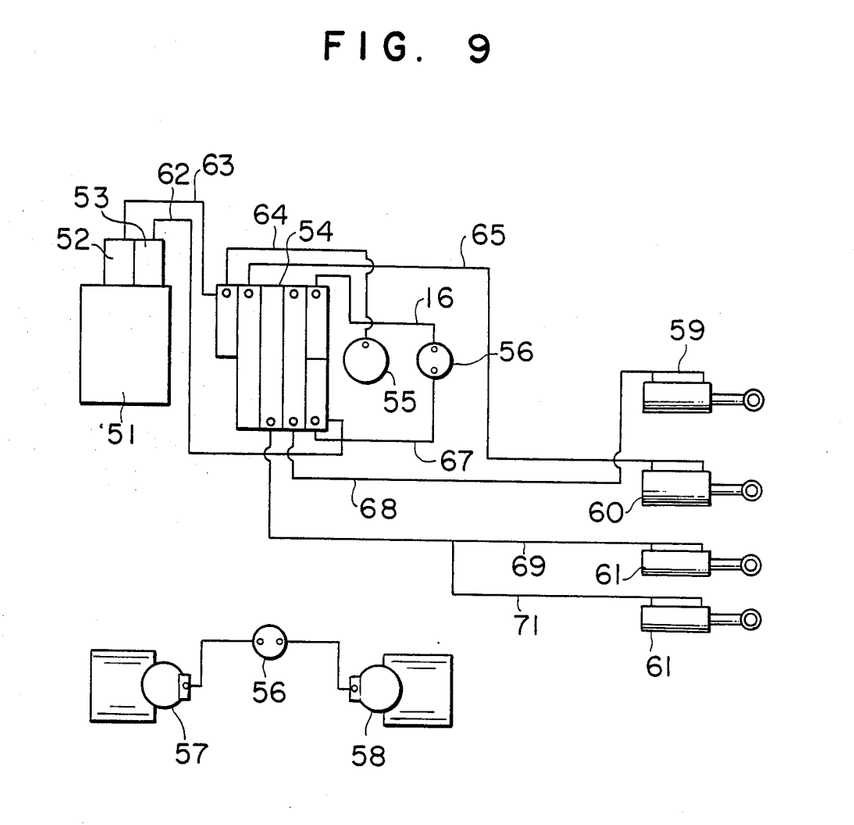
FIG. 9 is a basic diagram of the hydraulic system of a hydraulic shovel to which the present invention is applied.

FIG. 9 is a diagram of the basic structure of the hydraulic system for a hydraulic shovel. The hydraulic system includes an engine 51 which is a drive source, thrust-radial hydrostatic bearing type pumps 52 and 53 of this invention, a control valve group 54 for controlling the various hydraulic cylinders, a slewing motor 55, center joints 56 which are rotary joints 56, travelling motors 57 and 58, a hydraulic cylinder for bucket 59, a hydraulic cylinder for an arm 60, a hydraulic cylinder for a boom 61, and pipings 62 to 70 which connect the elements of the hydraulic system.

A basic operation of the thus-arranged hydraulic system will be described below.

The pump is driven by the engine to discharge high pressure fluid. This high pressure fluid is supplied to the slewing hydraulic motor which drives the slewing system through the control valves, the travelling hydraulic motor which drives the travelling system, and the various hydraulic cylinders for the boom, arm, and bucket for actual excavation.

In this hydraulic system for the hydraulic shovel, increase in the rated pressure increases the performances of the system such as an operation speed and travelling and excavating capacities, enables the energy conservation and reduction in size of the hydraulic system, and increases the space factor for installation of the system.

In this invention, even when the piston reaction force loads and the moment loads vary with the rotational speed of the drive shaft and the loads which vary in correspondence with the number of pistons associated with the discharge pressure act on the drive disc, metal contact of the sliding surface of the drive disc can be eliminated, and smooth operation which is suited for the loads applied is ensured. These in turn ensure that a high-pressure, small sized, thrust radial hydrostatic bearing and bent axis type axial piston machine to have an increased durability. Further, leakage from between the sliding surface of the drive disc can be minimized, reducing the power loss caused by the leakage and increasing the performance of the axial piston machine.

What is claimed is:

1. A thrust hydrostatic bearing device for use in an axial piston machine including a housing cover, a cylinder block having a plurality of cylinder holes, and pistons movable back and forth in corresponding cylinder holes and fixed to piston rods rotatably engaged with a disc portion of a drive shaft of said axial piston machine, said pistons being mounted such that they are inclined with respect to said drive shaft, hydrostatic pads disposed at locations at which the equation $e_L \cdot \theta_L = e_R \cdot \theta_R$ is satisfied, where axes each other and to the axis of a bearing sleeve fixed into said housing cover for rotatably supporting said drive shaft through a bearing are called the x-axis and y-axis, $e_L$ is the difference between the x-coordinate $e_O$ of the mean point of application of the piston reaction forces and the x-coordinate $E_L$ of the centers of a number of said hydrostatic pads disposed on the side of points of application of said reaction forces, $e_R$ is the sum of the x-coordinate $e_O$ of the mean point of application of the piston reaction forces and the x-coordinates $E_R$ of the centers of a number of said hydrostatic pads disposed on the side at which said reaction forces are not applied, $\theta_L$ is the angle between the center of each of said hydrostatic pads disposed on said side of points of application of said reaction forces and the x-axis, and $\theta_R$ is the angle between the center of each of said hydrostatic pads disposed on said side at which said reaction forces are not applied and the y-axis.

2. A thrust hydrostatic bearing device for use in an axial piston machine according to claim 1, wherein, when the number of said pistons is Z, the x-coordinate of the centers of said hydrostatic pads disposed at said side of points of application of said piston reaction forces is further from said drive shaft than the x-coordinates of the points of application of said resultant force of said piston reaction forces when the number of said pistons located on the discharge pressure side is $$\left( \frac{z-1}{2} \right).$$

3. A thrust hydrostatic bearing device for use in an axial piston machine including a housing cover, a cylinder block having a plurality of cylinder holes, and pistons movable back and forth in corresponding cylinder holes and fixed to piston rods rotatably engaged with a disc portion of a drive shaft of said axial piston machine, said pistons being mounted such that they are inclined with respect to said drive shaft, a bearing sleeve being fitted into said housing cover for rotatably supporting said drive shaft through a bearing is provided with hydrostatic pads which are capable of leading static pressures, some of said hydrostatic pads being positioned at the side of said bearing sleeve at which the resultant force of piston reaction forces is applied and others of said hydrostatic pads being positioned at the side thereof at which said resultant force is not applied, in such a manner that the equation $F_p \geq W \geq F_s$ holds, where $F_p$ is said resultant force of said piston reaction forces, W is the load capacity of the surface of guiding the pads' static pressures, and $F_s$ is the rod thrust acting against said pads.

4. A thrust hydrostatic bearing device for use in an axial piston machine including a housing cover, a cylinder block having a plurality of cylinder holes, and pistons movable back and forth in corresponding cylinder holes and fixed to piston rods rotatably engaged with a disc portion of a drive shaft of said axial piston machine, said pistons being mounted such that they are inclined with respect to said drive shaft, a bearing sleeve being fitted into said housing cover for rotatably supporting said drive shaft through a bearing and having three hydrostatic pads, said three hydrostatic pads being disposed on said bearing sleeve at locations at which the equation $W_L \cdot E_L = W_R \cdot E_R$ is satisfied, where axes perpendicular to each other and to the axis of said bearing sleeve are the x-axis and y-axis, $W_L$ is the sum of load capacities of two of said hydrostatic pads that are disposed at the side of the points of application of the resultant force of the piston reaction forces, $W_R$ is the load capacity of the remaining hydrostatic pad that is disposed on the side at which said piston reaction forces are not applied, $E_L$ is the distance between the x-coordinate of the mean point of application of said resultant force of said piston reaction forces and the x-coordinate of the point at which a line passing through the centers of said two hydrostatic pads intersects the x-axis, and $E_R$ is the distance between the x-coordinate off the mean point of application of said resultant force of said piston reaction forces and the x-coordinate of the center of the hydrostatic pad disposed on the side at which said piston reaction forces are not applied.

5. A thrust hydrostatic bearing device for use in an axial piston machine according to claim 4, wherein said two hydrostatic pads disposed on said side of points of application of said resultant force of said piston reaction forces are located farther away from said drive shaft than the points of application of said resultant force of said piston reaction forces which correspond to a number $(z-1)/2$ of said pistons, when the total number of said pistons is Z.

6. A thrust hydrostatic bearing device for use in an axial piston machine including a casing, a cylinder block having a plurality of cylinder holes, and pistons movable back and forth in corresponding cylinder holes and fixed to piston rods rotatably engaged with a disc portion of a drive shaft of said axial piston machine, said pistons being mounted such that they are inclined with respect to said drive shaft, means for adjusting in synchronism with the angle of inclination of said cylinder block a restricted area formed by an oil groove communicating with a discharge port of a port plate having one end surface in slidable contact with said cylinder block and another end surface in slidable contact with said casing, as well as an oil groove provided in a seal land for a discharge port in an arcuate, inclined sliding surface of said casing, said bearing device further including an oil passage for communicating an adjusted discharge pressure of said axial piston machine to an end face of a hydrostatic pad at a side of a rod provided in a thick wall portion of said casing thereby rotatably supporting said disc portion of said drive shaft.

7. A thrust hydrostatic bearing device for use in an axial piston machine according to claim 6, wherein said oil groove provided in said port plate is wedge-shaped.

8. A thrust hydrostatic bearing device for use in an axial piston machine according to claim 6, wherein said oil groove provided in said seal land is wedge-shaped.

* * * * *